United States Patent [19]

Lang et al.

[11] Patent Number: 5,201,548
[45] Date of Patent: Apr. 13, 1993

[54] METHOD AND MEANS FOR PUBLISHING IMAGES HAVING COLORATION AND THREE-DIMENSIONAL TEXTURE

[75] Inventors: Stefan Lang, Scarborough; Harvey Kalef, Toronto, both of Canada

[73] Assignee: Artagraph Reproduction Technology Incorporated, Ontario, Canada

[21] Appl. No.: 830,470

[22] Filed: Feb. 6, 1992

Related U.S. Application Data

[62] Division of Ser. No. 507,743, Apr. 12, 1990, abandoned.

[51] Int. Cl.$^5$ .............................................. B42D 5/04
[52] U.S. Cl. ........................................ 283/2; 283/117; 40/124.1
[58] Field of Search ................. 283/117, 2, 904, 4; 264/219, 220, 227, 132; 40/124.1; 446/147

[56] References Cited

U.S. PATENT DOCUMENTS

| | | | |
|---|---|---|---|
| 36,821 | 10/1862 | Poitevin | 264/227 |
| 2,393,809 | 1/1946 | Potter | 283/2 |
| 2,765,512 | 10/1956 | Nesbit | 264/28 |
| 3,565,978 | 2/1971 | Folger et al. | 264/227 |
| 3,846,533 | 11/1974 | Carrier | 264/220 |
| 3,917,786 | 11/1975 | Weigert | 264/227 |
| 3,989,790 | 11/1976 | Bruner et al. | 264/220 |
| 4,001,062 | 1/1977 | Iisaka et al. | 264/132 |
| 4,091,154 | 5/1978 | Hirai | 264/129 |
| 4,120,930 | 10/1978 | Lemelson | 264/225 |
| 4,285,744 | 8/1981 | Rudolph et al. | 264/220 |
| 4,308,224 | 12/1981 | Becker | 264/220 |
| 4,971,743 | 11/1990 | Lang | 264/132 |
| 5,102,171 | 4/1992 | Saetre | 283/117 |
| 5,120,090 | 6/1992 | Reinl | 283/117 |

FOREIGN PATENT DOCUMENTS

| | | |
|---|---|---|
| 990506 | 6/1976 | Canada . |
| 2904194 | 9/1979 | Fed. Rep. of Germany . |
| 1493516 | 7/1967 | France . |
| 1548337 | 10/1968 | France . |
| 51-59515 | 5/1976 | Japan . |
| 57-126624 | 8/1982 | Japan . |
| 1107401 | 3/1968 | United Kingdom . |

*Primary Examiner*—Timothy V. Eley
*Attorney, Agent, or Firm*—Hill, Steadman & Simpson

[57] ABSTRACT

A method and apparatus of faithfully reproducing a multicolor image having three-dimensional texture utilizes a photomechanically reproduced copy of the image on a carrier substrate which is suitable for embossing and a matrix providing the three-dimensional textured characteristics of the image is used to electrolytically form a female embossing die corresponding to the shape of the matrix whereupon a complemental male embossing die is made by means of which the carrier may be squeezed between the male and female dies to produce a highly accurate copy exhibiting the coloration and fine detail of the image texture. Various end uses are contemplated.

4 Claims, 1 Drawing Sheet

METHOD AND MEANS FOR PUBLISHING IMAGES HAVING COLORATION AND THREE-DIMENSIONAL TEXTURE

This is a division of application Ser. No. 507,743, filed Nov. 12, 1990, now abandoned.

BACKGROUND OF THE INVENTION

1. Field of the Invention

This invention relates generally to a new and improved method and means for publishing images having coloration and three-dimensional texture. Products produced by the processes contemplated can include a wide variety of products including a surface having a three-dimensional textured characteristic as well as color and may include works of art, calendars, menus, catalogs, greeting cards, packaging or images including printed typographical and pictorial matter or composites thereof.

2. Description of the Prior Art

The state of the prior art is represented by known lithographic processes which reproduce images in contrasting colors, but in a flat two-dimensional form and embossing processes which reproduce images in three-dimensional form, but without coloration and fine detail.

SUMMARY OF THE INVENTION

In accordance with the principles of the present invention, a new and improved method and means is contemplated wherein a subject having a sensible image displaying colored hues and exhibiting three-dimensional texture may be accurately and faithfully reproduced in fine detail.

In one exemplary aspect of the invention, an original matrix or a semi-original proof or matrix of an original work is created with the same texture or three-dimensional characteristics as the original work to be published, whereupon an embossing die capable of transferring the texture of the semi-original proof or matrix to a carrier substrate is produced.

The carrier substrate is photographically preconditioned by photomechanical means and the carrier substrate is then embossed by means of the die to replicate the original work so that the final product exhibits all of the characteristics of both coloration and texture.

End use of the product thus produced can be in a wide variety of different products.

DESCRIPTION OF THE PREFERRED EMBODIMENTS

While the process of the present invention is of widespread applicability, a particularly useful exemplification thereof, which illustrates the applicable principles of the inventive improvements, is made in the reproduction on a carrier substrate of a textured colored work of art such as an oil painting on canvas.

Such exemplary process will be described as one species of the broad image publishing genus contemplated by the principles of the present invention.

Figure 1:
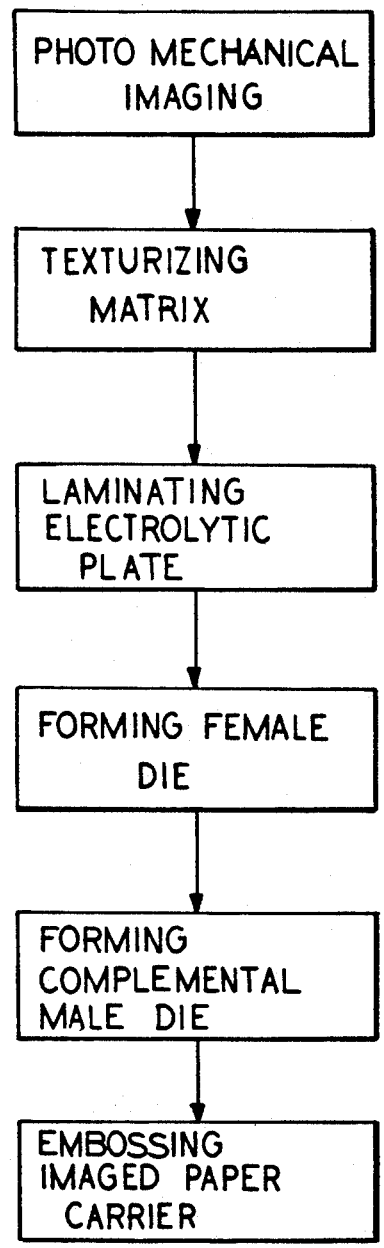
FIG. 1 is a flow chart illustrating the general principles of a present invention in terms of the different stages of the process practiced in accordance with the present invention.
Figure 2:
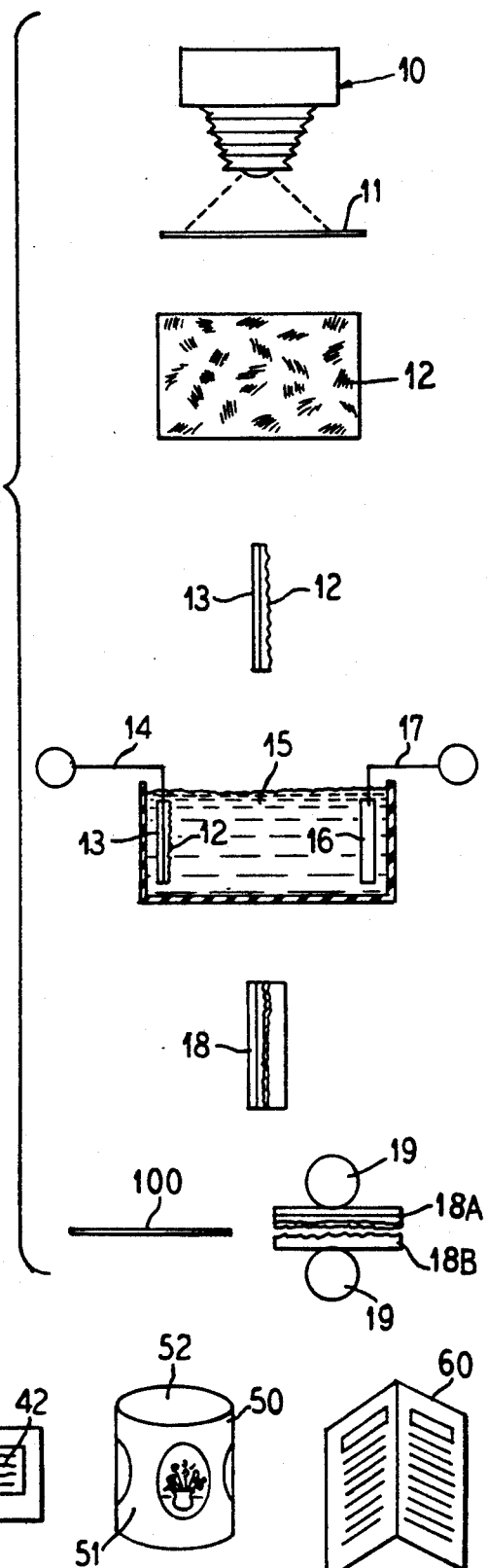
FIG. 2 is a series of schematic views illustrating how the steps of the process are practiced.

As shown in FIGS. 1 and 2, a photomechanical imaging means is shown generally at 10 for imaging a painting shown at 11.

In order to reproduce the color variations of the subject image, color separations are prepared from the original artwork. A photograph of the painting is taken and a colored positive transparency is produced. The color separation using a four-color or a six-color separation, or more if required, is prepared using an offset press and then printed on a selected material which is susceptible to embossing. It is contemplated by the present invention that suitable materials would be paper or paper-based products and also sheet-form plastic. One such example is a pvc coated sheet of about 300 microns in thickness which is commercially available as MAYFAIR (trademark) stock paper, although other papers having other display characteristics may be utilized.

In order to reproduce a three-dimensional colored image surface of an oil painting, it would be possible to use the painting itself as a matrix. However, alternatively, in the present process, particularly if it is desired to preserve the original, an early step in the process would be to create a semi-original proof or matrix depicted in FIG. 2 at 12 and which will reproduce the brushstrokes and/or the three dimensional characteristics of the original painting. The choice of the desired medium upon which the semi-original proof or matrix is made depends upon the extent of the three-dimensional depth to be reproduced. For example, if no texture is present other than the brushstroke itself, then a sheet of clear MYLAR (trademark) or a similar substance may be used. If a canvas texture is desired and the painting exhibits deep relief as with heavy deposits of pigment made with a knife or painting tool, then a sheet of clear self-adhesive pvc may be used. Such products are commercially available under such tradenames or trademarks DRYTAC (trademark) or SATINEX (trademark).

For example, to create a canvas texture on the semi-original proof or matrix, the desired size of the specimen is first determined and then two sheets of pvc material are cut to a size marginally larger than the semi-original proof or matrix which is required. The sheets are then perforated randomly and the backing is removed from each sheet and the sheets are stuck together. A piece of canvas is then applied on top of the sheet and heat and pressure is applied at sufficient values of pressure and temperature to effectively transfer the texture of the canvas. In one example of the inventive process, we have successfully applied 70 tons of pressure for about 10 minutes at about 120° C., whereupon the matrix 12 is cooled down to the temperature of the ambient, for example, room temperature. Other values could be used without departing from the spirit of the present invention.

In order to re-create the brushstrokes of the original painting, the assembly thus far provided is painted and coated, preferably with acrylic-based substances. Such substances are used because they are available in generally fast drying, versatile, flexible and extremely durable form. More importantly, acrylics hold texture and can be successively built up layer by layer to achieve an optimum texture corresponding to the brushstrokes and the three-dimensional characteristics of the original.

In order to accomplish such objective, a print is first made photomechanically of the original work of art to be reproduced. The print may be made on a carrier substrate such as a coated or uncoated paper or the print may be made on a sheet-form plastic material or, for that matter, the print may be made on a substrate such as glass. A palette knife may be used to form modeling paste which is made of an acrylic polymer latex emulsion, into a rough form of the original brushstrokes. An acrylic paint is then applied with a brush and the work is left to dry. Once dry, a clear acrylic varnish is coated on the entire semi-original proof or matrix to seal it. This varnish may have a gloss or a matte finish depending upon the image and the final effect desired.

If a heavier texture is desired, modeling paste may be used which has been mixed with marble dust and acrylic paint. With this combination, brush strokes are more clearly defined than painting with just acrylics which tend to dry flat.

In order to create an embossing die component capable of transforming the texture of the semi-original proof or matrix onto a carrier substrate in a repetitively reliable manner, a brass backing plate 13 is prepared which is equal to the semi-original proof or matrix 12 in size. An acrylic plating module is first bonded with cement on one side of the brass plate and the back of the semi-original proof or matrix 12 is cemented to the other side of the brass plate 13.

The next step is to make the non-conductive surface of the semi-original proof or matrix 12 conductive. This can be accomplished by spraying the surface with silver and a reducing agent until the semi-original proof or matrix is completely covered and is completely free of pin holes or other infirmities. The result is a mirror finish of a thin electrically conductive coating of silver which is then rinsed in water.

One example of how such coating can be applied is to mix about 2.5 ounces of silver nitrate to about one gallon of water and to spray the silver and reducing agent onto the semi-original proof or matrix at the same time. The silver coating produced will be about one one-millionth of an inch in thickness. Other mixtures can be used without departing from the spirit of the invention.

The next step is to coat or plate the silver-coated semi-original proof or matrix electrolytically, for example, with a nickel plating. The semi-original proof or matrix 12 on the brass plate 13 is first connected to the electrical leads 14 and is placed in a nickel plating bath 15, plated with nickel from a supply of nickel 16 connected to electrical leads 17 and then removed and rinsed. By utilizing the electrolytic process, the nickel plating is deposited only on the silver coated side of the assembly.

If it is desired to coat the silver coated semi-original proof or matrix with an exemplary coating of say 24 thousandths of an inch of nickel plating, one exemplary bath is made of nickel sulfamate in aqueous solution comprising about 43.6 ounces of nickel sulfamate, 4.0 ounces of boric acid and about 3% anti-pitting agents in each U.S. gallon. In order to coat well, it is preferred to apply about 18 amperes per square foot using about 5 volts. The plating takes place over about a 24-hour period and will plate about one thousandth of an inch per hour. Other silver coating techniques may be practiced in accordance with this invention.

The next step is to coat or plate the nickel-coated semi-original proof or matrix with a copper plating 18. Again, the nickel plated semi-original proof or matrix is placed in a copper plating bath, the electrical leads are connected, and electrical current in appropriate values is applied until the desired thickness is obtained.

In one example of a successful run, the semi-original proof or matrix 12 was provided with a minimum thickness of one-quarter of an inch to form a die component 18A. A bath was provided containing 26 ounces of copper sulphate, 9 ounces of sulfuric acid and 50 ppm chloride ions, per gallon of water. The semi-original proof or matrix 12 was placed in the bath, the electrical leads were connected and about 80 amperes per square foot were applied through the leads to the surface so that the plate thickness was achieved in the order of about $\frac{1}{8}$ inch to about $\frac{1}{4}$ inch. The plate was then removed from the bath and the electrical leads disconnected.

The semi-original proof or matrix is removed from the die and the acrylic material is cleaned from the textured side of the die 18A. It is not precisely known as to how much of the silver is removed when the semi-original proof is removed, but the effect is to leave a die made essentially of copper and nickel. The copper growths are removed from the copper plated side of the die 18A and the die 18A is milled on the copper side to about $\frac{1}{4}$ inch in thickness, preferably flat.

Next, the photographic reproduction is embossed in order to apply texture to the print in such a manner that the texture of the original is matched to the coloration of the photomechanically produced print. A polymer based lacquer is added to the surface for protective purposes. In order to give the finished product rigidity, it may be laminated onto a backing such as a foam board. Another suitable backing is achieved by laminating the printed sheets to a chipboard sheet using a resin based adhesive material which is then cut to size.

In accomplishing the embossing, it is contemplated that a male die 18B will first be made from the female die component 18A and the die is then set into a press shown schematically in FIG. 2 at 19. The temperature is then elevated to a range from about 115° C. to about 155° C., and the pressure is set in a suitable range, for example in the order of about one ton per square inch. The printed sheets are shown at 100 and are fed into the embossing machine 19 and the texture is added by pressing the printed sheet 100 between the male and female die parts 18A and 18B and the camera ready art.

Simultaneously, a foil is applied and the heat from the press activates the wax release agent and the sizing agent, which then releases the foil polymer from the polyester and makes the sizing adhere to the printed sheet 100. The textured and coated sheet is then fed out of the press 19 while a new one is fed in during a continuous process.

One suitable type of machine is commonly referred to as a BOBST (trademark) letterpress type of printing process machine. The process uses foil, heat, impression and speed, as the elements of the process. Various chemicals are applied in a web printing fashion to a polyester or MYLAR (trademark) to produce a foil having the desired characteristics. The chemicals are then applied by means of an embossing and stamping press which uses a combination of heat and pressure to transfer the foil to the printed substrate.

Figure 3:
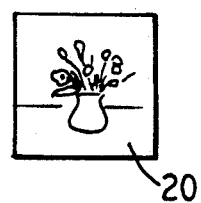
FIGS. 3, 4, 5, 6 and 7 are views of various products which can be advantageously constructed in accordance with the principles of the present invention.

The process of the present invention has many applications. As depicted in FIG. 3 and as described in connection with the exemplary process used for illustrative purposes, it may be used to reproduce works of art such as shown at 20 and FIG. 3, which are themselves viewed and displayed as works of art.

Figure 4:
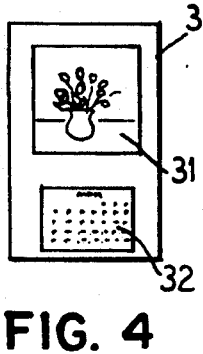

Another useful ares of application is in connection with the production of a calendar a shown in FIG. 4 at 30. The calendar may include a work of art 31 and a monthly calendar 32, and multiple sheets for the various months.

Figure 5:
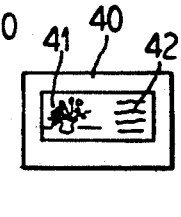

Another useful application can be made in connection with greeting cards such as the greeting card 40 illustrated in FIG. 5. Such greeting card may include pictorial matter as shown at 41 as well as printed or textural matter as illustrated at 42.

Figure 6:
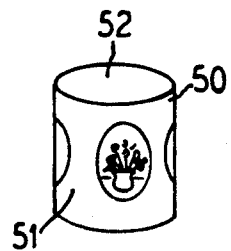

The principles of the present invention are especially applicable in the packaging art. In FIG. 6 is shown a special package 50 displaying a surface which may have characteristics of both coloration and three-dimensional texture on all or part of the package. For example, as illustrated in FIG. 6, there is a package which could be used to enclose perfume or some other cosmetic product and the package is shown as having a cylindrically outer casing 51 and provided with a top and bottom illustrated at 52. All or part of the package could display both coloration and three-dimensional texture.

Figure 7:
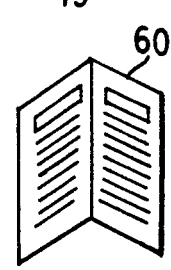

In FIG. 7 there is shown an article 60 which could be a menu card or which may be a catalog scored and folded to provide a multi-page unit. It will be understood that the menu card 60 used in the illustration could display some form of printed article in which it is desirable to include images having both coloration and three-dimensional texture.

Although minor modifications might be suggested by those versed in the art, it should be understood that we wish to embody within the scope of the patent warranted hereon all such modifications as reasonably and properly come within the scope of our contribution to the art.

The embodiments of the invention in which an exclusive property or privilege is claimed are defined as follows:

1. A reproduction of a sensible image having coloration and three-dimensional texture in fine detail, comprising:
   a carrier made of an embossible material selected from a class including cellulosic paper and plastic sheet film and having a pictorial print of the sensible image affixed to one face of the carrier, which pictorial print has multiple colors displayed in an array of fine detail;
   a three-dimensional image embossed in said carrier in registry with the pictorial print in accordance with the coloration and three-dimensional texture of said sensible image;
   said carrier and the pictorial print affixed thereon thereby comprising a reproduction of the sensible image in substantially faithful detail.

2. A calendar comprising:
   a tablet of pages corresponding in number to the months of a year, each said page comprising a reproduction of a sensible image having coloration and three-dimensional texture in fine detail, said reproduction comprising a carrier made of an embossible material selected from a class including cellulosic paper and plastic sheet film and having a pictorial print of the sensible image affixed on one face thereof which has multiple colors displayed in an array of fine detail said carrier being embossed with an image in registry with the pictorial print so as to produce a reproduction substantially having the coloration and three-dimensional texture of said sensible image.

3. A greeting card comprising a sheet-form member constituting a carrier made of an embossible material selected from a class including cellulosic paper and plastic sheet film and having a pictorial print affixed to one face thereof which has multiple colors displayed in an array of fine detail; and
   said carrier being embossed with an image in registry with the pictorial print so as form an image having coloration and three-dimensional texture,
   thereby to texture said carrier and the pictorial print affixed thereon as a reproduction of an original sensible image.

4. A printed article comprising a sheet-form member scored and folded to form multiple page components, and at least some of such pages constituting a reproduction of a sensible image having coloration and three-dimensional texture in fine detail and further comprising a carrier made of an embossible material and having a pictorial print affixed on one face thereof which has multiple colors displayed in an array of fine detail,
   said pictorial print being a reproduction of said sensible image, said carrier being embossed with an image in registry with the pictorial print so as to impart said carrier with coloration and three-dimensional texture of said sensible image,
   thereby to texturize said carrier and the pictorial print affixed thereon as a reproduction of the sensible image.

* * * * *